US012759199B2

(12) United States Patent
Bridevaux et al.

(10) Patent No.: US 12,759,199 B2
(45) Date of Patent: Oct. 13, 2026

(54) COMPRESSION MOULDING METHOD AND DEVICE

(71) Applicant: AISAPACK HOLDING SA, Vouvry (CH)

(72) Inventors: Philippe Bridevaux, Troistorrents (CH); Bruno Thiollay, Larringes (FR)

(73) Assignee: AISAPACK HOLDING SA, Vouvry (CH)

( * ) Notice: Subject to any disclaimer, the term of this patent is extended or adjusted under 35 U.S.C. 154(b) by 52 days.

(21) Appl. No.: 18/723,135

(22) PCT Filed: Feb. 7, 2023

(86) PCT No.: PCT/IB2023/051072
§ 371 (c)(1),
(2) Date: Jun. 21, 2024

(87) PCT Pub. No.: WO2023/152631
PCT Pub. Date: Aug. 17, 2023

(65) Prior Publication Data

US 2025/0128455 A1 Apr. 24, 2025

(30) Foreign Application Priority Data

Feb. 8, 2022 (EP) .................................... 22155552

(51) Int. Cl.
*B29C 43/58* (2006.01)
*B29L 23/20* (2006.01)

(52) U.S. Cl.
CPC ...... *B29C 43/58* (2013.01); *B29C 2043/5833* (2013.01); *B29L 2023/20* (2013.01)

(58) Field of Classification Search
None
See application file for complete search history.

(56) References Cited

U.S. PATENT DOCUMENTS

| | | | | |
|---|---|---|---|---|
| 4,152,566 | A | 5/1979 | Magerle | |
| 4,931,006 | A | 6/1990 | Schwyn | |
| 5,176,923 | A | 1/1993 | Ito | |
| 2008/0044508 | A1 * | 2/2008 | Balboni | B29C 43/146 425/155 |
| 2008/0057147 | A1 | 3/2008 | Bergami et al. | |
| 2009/0127744 | A1 | 5/2009 | Hanot | |

(Continued)

FOREIGN PATENT DOCUMENTS

| | | | |
|---|---|---|---|
| CH | 695674 | A5 * | 7/2006 |
| EP | 0297257 | A1 | 1/1989 |

(Continued)

OTHER PUBLICATIONS

International Search Report for PCT/IB2023/051072 mailed Jun. 7, 2023, 4 pages.

(Continued)

*Primary Examiner* — Mohammad M Ameen
(74) *Attorney, Agent, or Firm* — NIXON & VANDERHYE

(57) ABSTRACT

A moulding method and device for moulding products from a dose of molten material, wherein the movement of a part of the mould towards another part of the mould is controlled in position and the compression movement represents between 5% and 40% of the cycle time.

15 Claims, 12 Drawing Sheets

(56) References Cited

U.S. PATENT DOCUMENTS

| | | | | |
|---|---|---|---|---|
| 2009/0160093 | A1 | 6/2009 | Hanot | |
| 2012/0018279 | A1 | 1/2012 | Laubli | |
| 2019/0039326 | A1 | 2/2019 | Voigtmann | |
| 2020/0055220 | A1 * | 2/2020 | Hermant | B29C 43/08 |

FOREIGN PATENT DOCUMENTS

| | | | |
|---|---|---|---|
| EP | 2364247 | B1 | 7/2012 |
| EP | 2024153 | B1 | 6/2016 |
| EP | 2018258 | B1 | 1/2017 |
| WO | 2017137079 | A1 | 8/2017 |

OTHER PUBLICATIONS

Written Opinion of the ISA for PCT/IB2023/051072 mailed Jun. 7, 2023, 9 pages.
European Search Report, issued in European U.S. Appl. No. 22/155,552 dated Jul. 6. 2022.
Office Action, issued in European Patent Application No. 23709746.4 dated May 26, 2025.

* cited by examiner

COMPRESSION MOULDING METHOD AND DEVICE

REFERENCE TO CORRESPONDING APPLICATIONS

This application is the U.S. national phase of International Application No. PCT/IB2023/051072 filed Feb. 7, 2023 which designated the U.S. and claims priority to EP 22155552.7 filed Feb. 8, 2022, the entire contents of each of which are hereby incorporated by reference.

TECHNICAL FIELD

The present invention relates to the compression moulding of articles of material in which an article is obtained by compressing a dose of material between two parts of a mould. The present invention applies more particularly to the manufacture of plastic tubes e.g. for toothpaste or cosmetics, the tube being formed of a flexible cylindrical body joined to a head comprising a shoulder and an orifice. In this case, the tube head is formed and simultaneously welded to the body in one operation. The tube head is made from a dose of melt formed and compressed between a lower tooling called a die assembly and an upper tooling called a mandrel onto which the flexible cylindrical body is fitted. The temperature of the melt is such that it welds to the tube body. In a tube production machine, several moulds are usually driven in a discontinuous (or continuous) motion, each mould undergoing the different stages of the process (loading the tube body, depositing the dose of plastic material, compression moulding, cooling, demoulding and unloading the tube). The present invention makes it possible to improve the quality of the moulding and/or to increase the production rates thanks to a specific control of the movement of the press and of the dosing nozzle.

STATE OF THE ART

Compression moulding processes and devices for producing packaging tubes are described in EP0297257, EP2364247, EP2018258 and EP2024153. These documents propose changes to the machine and tools to improve the productivity and quality of the packages produced. However, the control of the main stages of the process has remained rather basic, particularly the control of the compression of the dose, and the control of the formation of the dose. The current approximate control system does not allow the production of optimal quality packages in all cases. The invention makes it possible to remedy this drawback among others.

Publication US 2008/044508 discloses an apparatus for moulding plastics, comprising a mould device, an actuating system arranged to move said mould device and a shock-absorbing device interposed between said actuating system and said mould device, wherein said actuating system comprises an electromechanical actuating system.

Publication CH 695 674 discloses a process for the production of plastic molded parts, in particular poured parts from packaging containers, preferably heads for packaging tubes.

Publication US 2020/055220 discloses an injection over-moulding device comprising at least one indexed rotary turret on which cooled moulds are installed, each mould comprising a plurality of cavities, and at least five stationary stations arranged around said turret, including at least a first station, a second station and a third station that are used, respectively, for carrying out the operations of positioning the inserts in the cavities of the mould, injecting plastic material into the cavities of the mould, and demoulding the at least partially cooled objects.

SUMMARY AND PRINCIPLE OF THE INVENTION

The present invention generally relates to the compression moulding of articles in which an article is obtained by compressing a dose of material between the two parts of a mould.

The present invention is applicable more particularly to the manufacture of plastic tubes, said tubes being formed of a flexible cylindrical body joined to a head comprising a shoulder and an orifice. In this case, the tube head is formed and simultaneously welded to the cylindrical body in one operation. The tube head is made from a dose of melt formed and compressed between a first part and a second part of a mould onto which the flexible cylindrical body is fitted. The temperature of the melted resin is such that it welds to the tube body. In a tube production machine, several moulds are typically driven in a discontinuous (or continuous) motion, with each mould undergoing the various stages of the process (loading the tube body, depositing the dose of plastic material, compression moulding and welding of the formed head to the body, cooling, demoulding and discharging the formed tube). Such devices are described in the prior art and for example in EP0297257, EP2364247, EP2018258 and EP2024153.

In the context of the present invention, it has been determined that a precise control, adapted to each part geometry and to each moulded material, produces packaging tubes of an optimum quality and brings substantive improvements over the known methods and products obtained by said methods.

In particular, it has been determined that the control of the compression movement of the dose, even if this compression movement is performed in a fraction of a second, has a significant influence on the quality of the moulded tube shoulders obtained.

It has also been determined that controlling the opening and closing movement of the dosing valve, even if the dose is formed in a fraction of a second, makes it possible to have an impact on the geometry of the dose, on its regularity and ultimately such control has a decisive influence on the quality of the dose obtained independently of the materials used.

According to the invention, these improvements are made possible among others by a servomotor control of the press and the dosing nozzle. A servo-controlled position on a movement carried out in a fraction of a second makes it possible to achieve optimum quality and to adapt the adjustments of the movement of the press and the dosing unit according to the materials (such as for example colour, grades, new recyclable, recycled, biosourced or biodegradable resins) and the geometries of the tube to be made (such as for example diameter, ovality).

The principles of the present invention are particularly advantageous for producing compression moulded tube heads with materials that have a reduced processing temperature range. This is the case, for example, with recycled resins which degrade more quickly under the effect of high temperature, or with biosourced or biodegradable resins whose processing temperature range is reduced. The invention makes it possible to avoid the overheating of these resins, and to avoid the resulting defects thanks to an optimal control of the dosing nozzle and of the compression speed. In this case, the invention makes it possible to reduce the contact time of the dose in the mould thanks to a high moulding compression speed.

The invention and its principles are particularly interesting for the use of resins which are more fluid such as biosourced or biodegradable resins which are impossible to use on conventional equipment. The invention and its principles make it possible to adjust the compression speed according to the viscosity and thermal properties of such resins and to avoid, for example, the flashes (overflow of material along the flexible cylindrical body) which occur with these resins when the compression speed at the end of filling is not sufficiently reduced.

The invention and its principles make it possible to control the compression movement at each moment or stage of the moulding process of the dose. The invention allows, for example, the compression speed to be adjusted so as to have a flow of the material front which advances in the mould at a constant speed. This makes it possible to avoid, for example, strong variations in speed linked to the geometry of the moulded part and consequently to avoid the appearance of defects due to these speed variations.

The invention makes it possible to control the opening and closing movement of the dosing nozzle, which directly influences the geometry of the doses obtained. Thus, the geometry of the doses as well as the time of formation of the doses can be optimized. For example, for very fluid materials, it is advantageous to have a quick opening and closing of the dosing nozzle, thereby leading to a more compact dose which limits its creep due to gravity.

The invention avoids burrs on the doses due to the pressure of the resin in the dosing nozzle before opening. Thanks to a high initial opening speed, the burr is eliminated.

The invention makes it possible to obtain a succession of doses with little variation in mass, i.e. with a smaller dispersion of mass. This small dispersion of the mass of the doses leads to moulded objects with a small variation in thickness.

In embodiments, the invention concerns a moulding method for moulding products from a dose of molten material, with a moulding device comprising at least

- a dosing unit;
- at least one mould formed of at least a first part and a second part;
- an electrical motor that pilots a compression movement of at least one of said parts of the mould towards the other of said parts;
- a rotating turret;
- a spring that defines a moulding force;
- wherein at least the electrical motor and the dosing unit are in a fixed position in the moulding device;
- wherein at least one of said parts of the mould rotates with the turret; wherein the movement of one of said parts of the mould towards the other of said parts is controlled in position and the compression movement represents preferably between 5% and 40% of the cycle time.

In embodiments, the method comprises an approach movement of said parts of the mould towards each other wherein the approach movement represents preferably between 10% and 50% of the cycle time.

In embodiments, the method comprises a step of holding said parts of the mould under pressure which represents preferably between 5% and 50% of the cycle time In embodiments, a maximum closing speed is reached preferably between 5% and 25% of the cycle time. In embodiments, a constant speed is reached preferably between 65% and 95% of the cycle time.

In embodiments, a maximum closing acceleration is reached preferably between 2% and 20% of the cycle time and/or a maximum closing deceleration is reached preferably between 10% and 40% of the cycle time.

In embodiments, the invention concerns a moulding method for moulding products from a dose of molten material, with a moulding device comprising at least a dosing unit with a valve having at least an opening movement and a closing movement driven by a motor;

- wherein at least the opening movement of the valve is controlled in accordance with the material of the dose and the opening movement of the valve represents preferably between 5% and 70% of the cycle time.

In embodiments, the valve remains in a closed position preferably between 20% and 60% of the cycle time In embodiments, the closing movement of the valve represents preferably between 5% and 70% of the cycle time.

In embodiments, the opening movement speed of the valve passes through one or more maximum values at a time preferably between 2% and 50% of the cycle time and/or the closing movement speed of the valve passes through one or more maximum values at a time preferably between 30% and 80% of the cycle time.

In embodiments, the opening of the valve comprises preferably at least one acceleration and deceleration phase and/or the closing of the valve comprises preferably at least one acceleration and deceleration phase.

In embodiments, the maximum acceleration of the opening movement of the valve is reached preferably between 0.5% and 25% of the cycle time and/or the maximum deceleration of the opening movement of the valve is reached preferably between 3% and 45% of the cycle time.

In embodiments, the maximum acceleration of the closing movement of the valve is reached preferably between 25% and 65% of the cycle time and/or the maximum deceleration of the closing movement of the valve is reached preferably between 35% and 75% of the cycle time.

In embodiments, the invention concerns a moulding device comprising at least a dosing unit with a valve having at least an opening movement and a closing movement driven by a motor;

- at least one mould formed of at least a first part and a second part;
- an electrical motor that pilots a compression movement of at least one of said parts of the mould towards the other of said parts;
- a rotating turret;
- a spring that defines a moulding force;
- wherein at least the electrical motor and the dosing unit are in a fixed position in the moulding device
- and wherein at least one of said parts of the mould rotates with the turret.

In embodiments, the spring is placed between the motor and the moulding device.

In embodiments, the spring is placed between the rotating turret and one of said parts of the mould.

BRIEF DESCRIPTION OF THE DRAWINGS

1: press
2: fixed part of the press
3: moving part of the press
4: electric motor
5: air spring

6: press toggle
7: fixed frame
8: linear guide
9: rotational guide
10: moving frame
11*a*: coupling element of the fixed part
11*b*: coupling element of the mobile part
12: pneumatic cylinder
13: upper part of the mould
14: lower part of the mould
15: mould cavity
16: orifice pin
17: air spring
18: sliding sleeve of the mould
19: upper stop
20: lower stop
21: press position control curve, slow
22: press position control curve, fast
23: press position control curve, optimal
24: press speed curve, slow
25: press speed curve, fast
26: press speed curve, optimal
29: satellite turret
30: dosing unit
31: extrusion unit
32: extrusion screw
33: pneumatic cylinder
34: frame
35: dosing nozzle
36: dosing nozzle body
37: metering valve
38: orifice
39: tank
40: piston
41: step
42: electric motor
43: rack
44: valve
45: rotative turret
46: press acceleration curve, slow
47: press acceleration curve, fast
48: press acceleration curve, optimal
50: position control curve, slow, 200 ms
51: position control curve, fast 60 ms, 200 ms
52: position control curve, fast 30 ms, 200 ms
53: position control curve, fast 30 ms, 120 ms
54: speed control curve, slow, 200 ms
55: speed control curve, fast 60 ms, 200 ms
56: speed control curve, fast 30 ms, 200 ms
57: speed control curve, fast 30 ms, 120 ms
58: acceleration control curve, slow, 200 ms
59: acceleration control curve, fast 60 ms, 200 ms
60: acceleration control curve, fast 30 ms, 200 ms
61: acceleration control curve, fast 30 ms, 120 ms
FIG. 1 shows the press movement (y-axis, i.e. vertical axis) in millimeters versus time in seconds (x-axis, i.e. horizontal axis).

FIG. 2 shows the speed of the press movement (y-axis) in meters per second as a function of time in seconds (x-axis).

FIG. 3 shows the acceleration of the compression movement (y-axis) in meters per second squared as a function of time in seconds (x-axis).

FIG. 10 shows the opening and closing movement of the valve in millimeters as a function of time in seconds (x axis).

FIG. 11 shows the speed of the valve movement (y-axis) in millimeters per second as a function of time in seconds (x-axis).

FIG. 12 shows the acceleration of the valve movement (y-axis) in millimeters per second squared as a function of time in seconds (x-axis).

DETAILED DESCRIPTION

Figure 1:
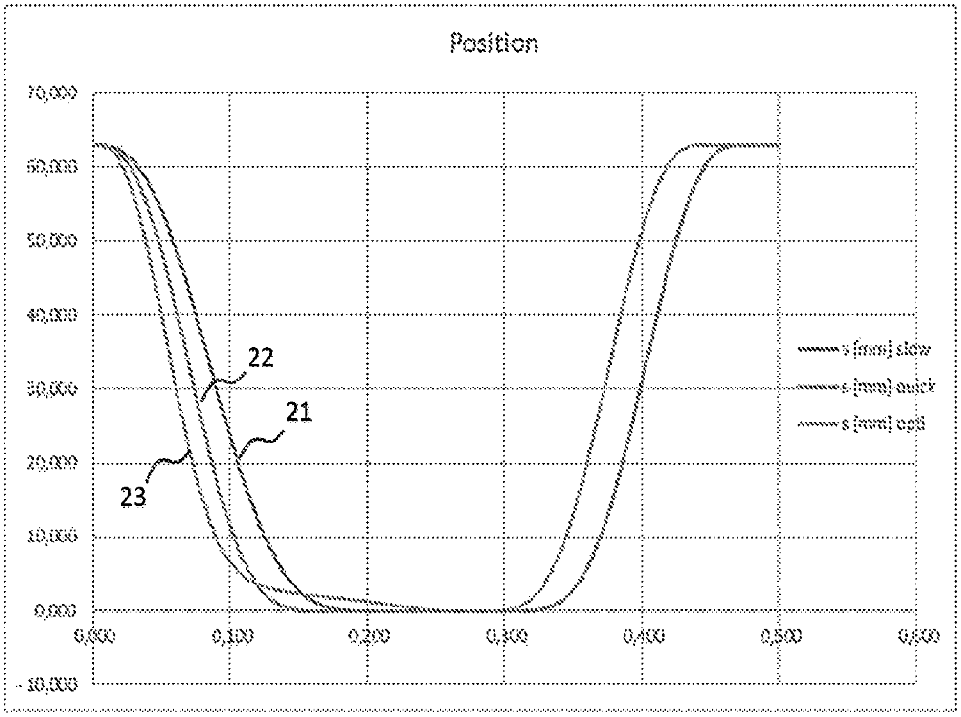
FIG. 1 shows examples of positional control of the press movement.

FIG. 1 illustrates examples of positional control of the press movement. In this figure, the movement along the compression axis in millimeters (y-axis) is shown as a function of time in seconds (x-axis). Curves 21, 22, and 23 illustrate three examples of positional control of the press movement as a function of time. It can be seen from these examples that the cycle time of the pressing movement is 0.5 seconds and consists mainly of 3 distinct parts. Initially, the press 1 is in the 63 millimeters position, i.e. in the open and rest position. In the first part, the so-called closing phase, the position of the press tool along the compression axis decreases to zero corresponding to the maximum compression position. In a second part, the holding phase, this maximum compression position is maintained for a period of time and thus defines a plateau. In the third part, the opening phase, the position of the press tool along the compression axis increases to return, preferably, to the initial rest position.

In FIG. 1, the decrease of the position value of the press tool 1 in the first part is arbitrary and does not indicate that the movement of the press tool is in the direction of gravity (downwards) or vice versa (upwards) or in another direction. It only indicates a closing of the mould and therefore a compression of the dose. The value of 63 mm is also an example and should not be considered a limitation. Other values are possible depending on the construction of the machine.

Curve 21 indicates that the maximum compression position is reached at 40% of the cycle time (0.2 seconds); while this position is reached at 30% of the cycle time (0.15 seconds) on control curve 22 and at 50% of the cycle time (0.25 seconds) on control curve 23. On control curve 23, the approach movement, which corresponds to the closing movement of the mold before compression of the dose is carried out very quickly (part of the curve between 0 and 0.1 seconds), while compression of the dose is carried out slowly (part of the curve between 0.1 s and 0.25 s).

On curve 21, the approach movement represents 30% of the cycle time (part of the curve between 0 and 0.15 s), the compression of the dose represents 10% of the cycle time (part of the curve between 0.15 and 0.20 s), the holding under pressure before opening the press represents 26% of the cycle time (part of the curve between 0.2 and 0.33 s), and the opening movement of the press represents 34% of the cycle time (part of the curve between 0.33 and 0.5 s).

On curve 22, the approach movement represents 34% of the cycle time (part of the curve between 0 and 0.12 s), the compression of the dose represents 6% of the cycle time (part of the curve between 0.12 and 0.15 s), the holding under pressure before opening the press represents 36% of the cycle time (part of the curve between 0.15 and 0.33 s), and the opening movement of the press represents 34% of the cycle time (part of the curve between 0.33 and 0.5 s).

On curve 23, the approach movement represents 20% of the cycle time (part of the curve between 0 and 0.1 s), the compression of the dose represents 30% of the cycle time (part of the curve between 0.1 and 0.25 s), the holding under pressure before opening the press represents 10% of the cycle time (part of the curve between 0.25 and 0.3 s), and the opening movement of the press represents 40% of the cycle time (part of the curve between 0.3 and 0.5 s).

According to the invention, the approach movement represents between 10% and 50% of the cycle time, and preferably between 20% and 35% of the cycle time.

According to the invention, the compression movement of the dose represents between 5% and 40% of the cycle time, and preferably between 10% and 30% of the cycle time.

According to the invention, the holding under pressure by the press represents between 5% and 50% of the cycle time, and preferably between 10% and 35% of the cycle time.

According to the invention, the opening movement of the press represents between 15% and 45% of the cycle time, and preferably between 25% and 40% of the cycle time.

In the context of the invention, it is important to note that the opening movement of the press initiates the rotation of the turret. Thus, during the opening movement of the press, the rotation of the turret is performed.

According to the invention, complex press 1 movements such as illustrated by curve 23 can be programmed. In this example, it is particularly advantageous to adopt a first phase of very rapid closing of the press, from the initial position to a position preceding contact of the mould with the dose; then a second phase of compression of the dose with a speed profile adapted to the thermal and rheological properties of the material of the dose; then a third phase of holding; and finally, a last phase of rapid opening of the press.

Figure 2:
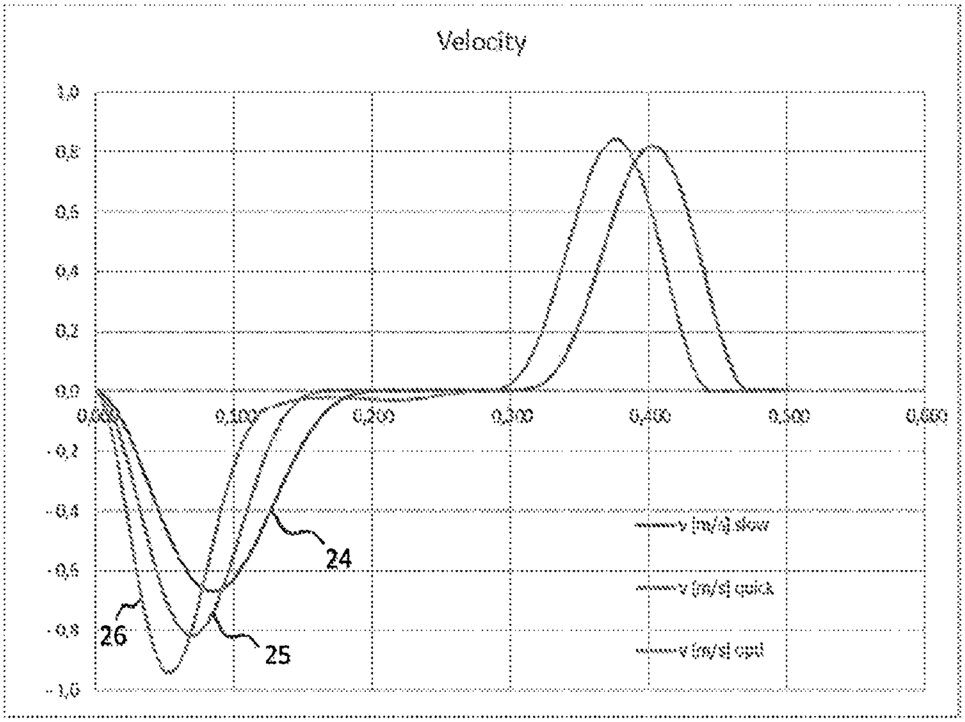
FIG. 2 shows the speed versus time of the press movement shown in FIG. 1.

FIG. 2 is an illustration of the speed versus time profile of the press movement shown in FIG. 1. In this figure the speed of the press movement in meter per second (y-axis) is plotted against time in seconds (x-axis).

In FIG. 2, a distinction is made between a first part where the speed is arbitrarily negative and corresponds to a closing speed of the press 1; and a second part where the speed is positive and corresponds to the opening speed of the press 1. The cycle time as shown in FIG. 2 is 0.5 seconds. At the initial and final time corresponding to the rest position, the press is in the open position. Of course, an inverted consideration could be made with a positive speed for closing and negative speed for opening, the rest of the explanation of FIG. 2 being correspondingly inverted.

On curves 24, 25 and 26, the initial speed is zero (press open) then passes through a maximum negative value corresponding to the closing of the mold and returns to zero (press closed), then the speed passes through a maximum positive value corresponding to the opening of the mold and returns to zero (press open).

On curve 24, the maximum closing speed (−0.668 m/s) is reached at time 0.089 s, i.e. at 17.8% of the cycle time. At time 0.2 s corresponding to 40% of the cycle time, the speed of the press movement is zero and the mold is closed. At time 0.3 s corresponding to 60% of the cycle time, the speed increases corresponding to an opening movement of the press. The maximum opening speed of 0.818 m/s is reached at time 0.403 s, i.e. at 80.6% of the cycle time.

On curve 25, the maximum closing (−0.818 m/s) is reached at time 0.069 s, i.e. at 13.8% of the cycle time. At time 0.15 s corresponding to 30% of the cycle time, the speed of the press movement is zero and the mold is closed. At time 0.3 s corresponding to 60% of the cycle time, the speed increases corresponding to an opening movement of the press. The maximum opening speed of 0.818 m/s is reached at time 0.403 s, i.e. at 80.6% of the cycle time.

On curve 26, the maximum closing speed (−0.938 m/s) is reached at time 0.053 s, corresponding to 10.6% of the cycle time. In the time interval between 0.1 s and 0.25 s, that is to say between 20% and 50% of the cycle time, the closing speed of the press is approximately constant and equal to 0.05 m/s. It is in this time interval that the dose compression molding operation is carried out. At time 0.25 s corresponding to 50% of the cycle time, the speed of the press movement is zero and the mold is closed. At time 0.3 s corresponding to 60% of the cycle time, the speed increases corresponding to an opening movement of the press. The maximum opening speed of 0.841 m/s is reached at time 0.375 s, corresponding to 75% of the cycle time.

According to the invention, the maximum closing speed of the press is comprised between 0.3 and 1.1 m/s, and preferably between 0.5 m/s and 1 m/s).

According to the invention, the maximum opening speed of the press is comprised between 0.3 and 1.1 m/s, and preferably between 0.5 m/s and 1 m/s).

According to the invention, the maximum closing speed of the press is reached between 5% and 25% of the cycle time, and preferably between 10% and 20% of the cycle time.

According to the invention, the maximum opening speed of the press is reached between 65% and 90% of the cycle time, and preferably between 70% and 85% of the cycle time.

According to the invention, a constant speed of the press is reached between 65% and 90% of the cycle time, and preferably between 70% and 85% of the cycle time.

According to a preferred embodiment of the invention, the compression molding of the dose is carried out at a low speed of between 0.01 m/s and 0.2 m/s and preferably between 0.05 m/s and 0.1 m/s.

The control of position 23 in FIG. 1 leads to a higher closing speed 26 illustrated in FIG. 2. Similarly, the position 21 control shown in FIG. 1 leads to a slower closing speed 24 shown in FIG. 2.

When controlling the position of the press movement, it is important to consider not only the travel speeds but also the accelerations of the press. These accelerations can be limited by the inertia effects of the device as well as by the power used. These curves may be derived from the speed curves shown in FIG. 2.

Figure 3:
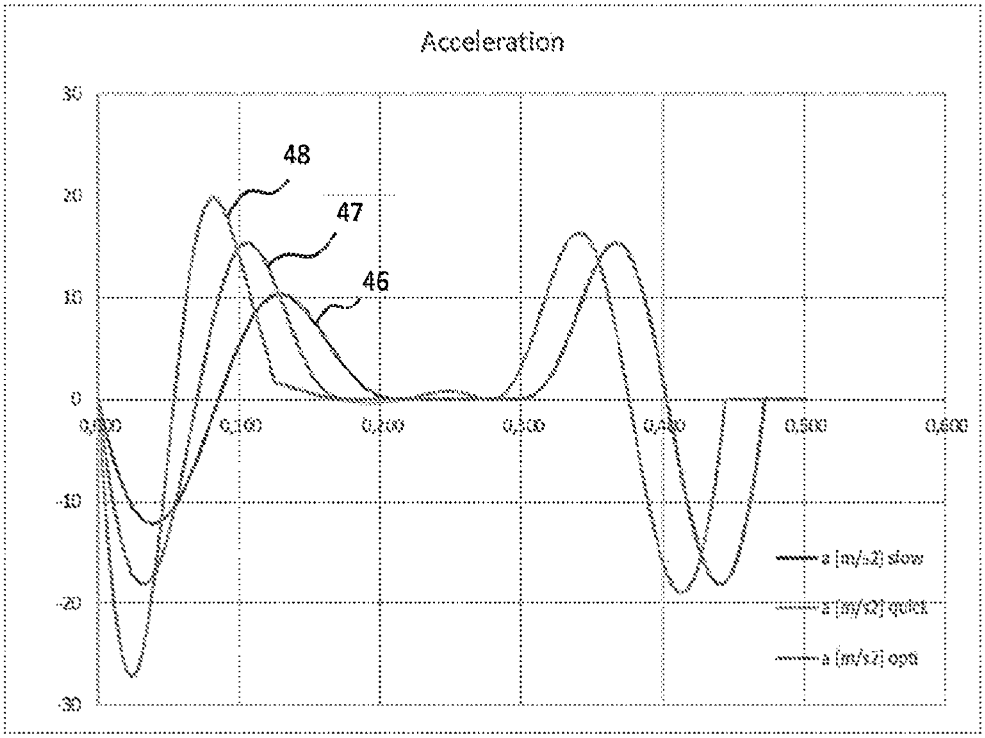
FIG. 3 shows the acceleration versus time of the press movement shown in FIG. 1.

FIG. 3 is an illustration of the acceleration versus time profile of the press movement shown in FIG. 1. In this figure the acceleration of the press movement in meter per second squared (y-axis) is plotted against time in seconds (x-axis).

The acceleration curves 46, 47 and 48 illustrated in FIG. 3 show between 0 s and 0.2 s a first phase of acceleration and deceleration linked to the closing of the press; and a second phase of acceleration and deceleration between 0.3 s and 0.5 s linked to the opening of the press.

On curve 46, the maximum acceleration of the closing movement (−12.2 m/s2) is reached at time 0.039 s, corresponding to 7.8% of the cycle time; and the maximum deceleration of the closing movement (10.3 $m/s^2$) is reached at time 0.128 s, corresponding to 25.6% of the cycle time. We also observe on curve 46 that the maximum acceleration of the opening movement of the press (15.3 $m/s^2$) is reached at time 0.367 s, corresponding to 73.4% of the cycle time; and the maximum deceleration of the opening movement (−18.1 $m/s^2$) is reached at time 0.442 s, corresponding to 88.4% of the cycle time.

On curve 47, the maximum acceleration of the closing movement (−18.1 $m/s^2$) is reached at time 0.031 s, corresponding to 6.2% of the cycle time; and the maximum deceleration of the closing movement (15.3 $m/s^2$) is reached at time 0.106 s, corresponding to 22.2% of the cycle time. We also observe on curve 47 that the maximum acceleration of the opening movement of the press (15.3 $m/s^2$) is reached at time 0.367 s, corresponding to 73.4% of the cycle time; and the maximum deceleration of the opening movement (−18.1 $m/s^2$) is reached at time 0.442 s, corresponding to 88.4% of the cycle time.

On curve 48, the maximum acceleration of the closing movement (−27.1 $m/s^2$) is reached at time 0.025 s, corresponding to 5% of the cycle time; and the maximum deceleration of the closing movement (19.7 $m/s^2$) is reached at time 0.081 s, corresponding to 16.2% of the cycle time. We also observe on curve 48 that the maximum acceleration of the opening movement of the press (16.3 $m/s^2$) is reached at time 0.342 s, corresponding to 68.4% of the cycle time; and the maximum deceleration of the opening movement (−18.1 $m/s^2$) is reached at time 0.414 s, corresponding to 82.8% of the cycle time.

According to the invention, the maximum acceleration and deceleration of the closing movement of the press are comprised between 5 and 40 $m/s^2$, and preferably between 10 $m/s^2$ and 30 $m/s^2$).

According to the invention, the maximum acceleration and deceleration of the opening movement of the press are comprised between 5 and 40 $m/s^2$, and preferably between 10 $m/s^2$ and 30 $m/s^2$).

According to the invention, the maximum acceleration of the closing movement of the press is reached between 2% and 20% of the cycle time, and preferably between 4% and 15% of the cycle time.

According to the invention, the maximum deceleration of the closing movement of the press is reached between 10% and 40% of the cycle time, and preferably between 15% and 30% of the cycle time.

According to the invention, the maximum acceleration of the opening movement of the press is reached between 40% and 85% of the cycle time, and preferably between 60% and 80% of the cycle time.

According to the invention, the maximum deceleration of the opening movement of the press is reached between 55% and 95% of the cycle time, and preferably between 60% and 90% of the cycle time.

Other press control curves such as those shown in FIGS. 1, 2 and 3 can be used. The invention allows the speed profile to be adjusted at the time of compression of the dose; at the beginning of compression for example or at the end of compression when the mould cavity is almost completely filled. At the end of the filling process, for example, the speed can be reduced to avoid material spilling out of the cavity.

FIGS. 4 to 8 illustrate examples of tube moulding devices with servo drive according to the invention.

Figure 4:
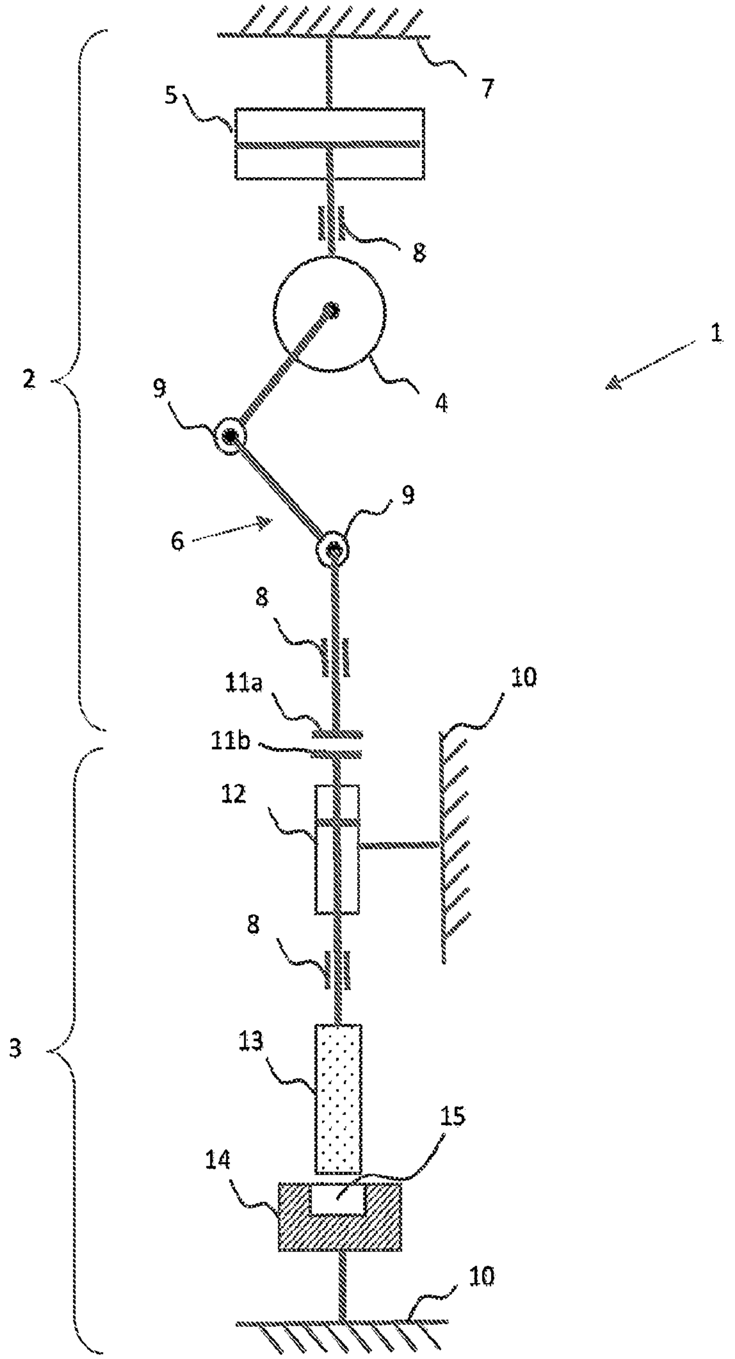
FIGS. 4 to 9 illustrate examples of tube compression devices and systems with a servo drive according to the invention.

The compression device illustrated in FIG. 4 comprises a press 1, at least composed of a fixed part 2 and a mobile part 3; the mobile part 3 being coupled with the fixed part 2 during the closing movement of the mould.

The fixed part of the press allows the closing movement of the mould to be controlled in a precise and repetitive manner, thanks to an electric motor 4, a toggle system 6, rotational guide means 9, linear guide means 8, a coupling element 11*a* and an air spring 5. Unlike in the prior art where the control is made by pressure, the present invention uses a position control which is therefore more predictable and more precise and allows to achieve the aims of the present invention.

Figure 15:
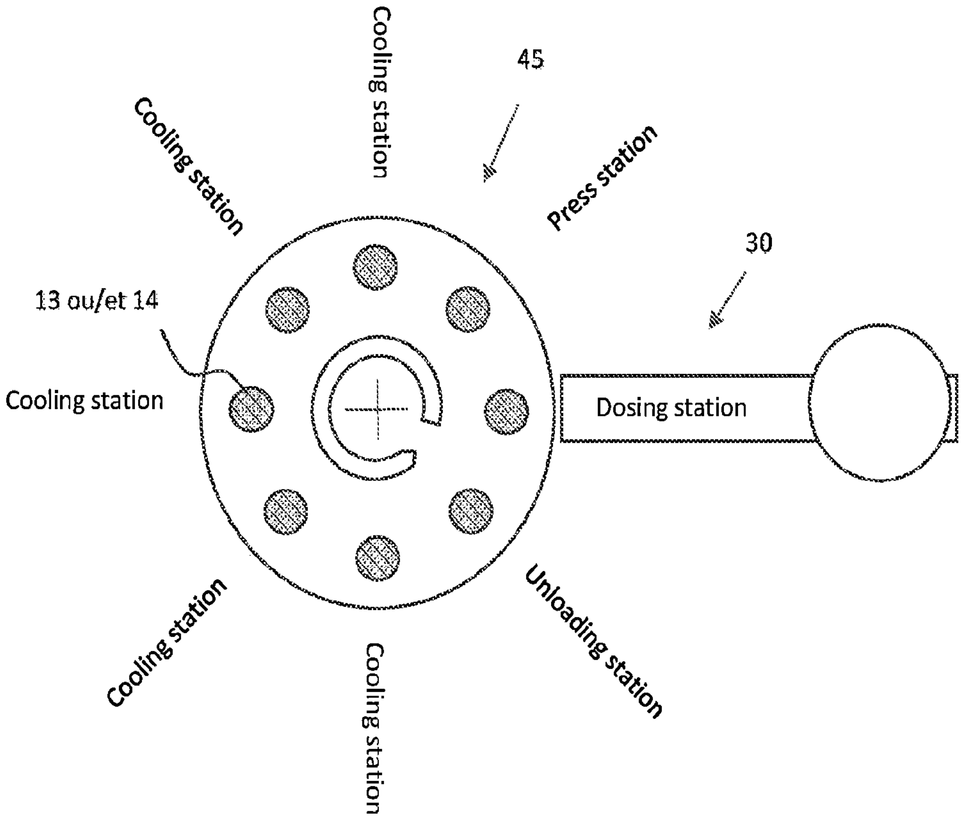
FIGS. 15 and 16 illustrate a schematic view of examples of compression moulding machines according to the present invention.

The mobile part of the press 3 is attached to the frame 10 of a rotating turret 45 (see FIG. 15). The mobile part of the press 3 comprises a set of modules consisting of an upper mould part 13, a lower mould part 14, translation guide means 8 and a pneumatic cylinder 12. These modules are successively coupled to the fixed part of the press at each moulding cycle by means of coupling means of the mobile part 11*b*.

An advantage of the principles of the invention is to use the same electrically controlled fixed part of the press for several moulds (moving part). This increases the precision and reduces the dispersion between the parts produced.

The fixed part of the press 2 also includes a pneumatic spring 5 which allows to absorb the mass variations of the dose compressed in the mould cavity 15. In fact, as the closing movement of the mould is controlled in position, it is necessary to impose a closing movement of the mould greater than the theoretical thickness of the part (corresponding to the theoretical volume of the dose), in order to absorb the inevitable variations in the mass of the doses.

According to the invention, the pneumatic spring 5 is compressed when the mould is filled and the press completes its downward movement (mould closing) to reach the desired position. The air spring 5 prevents the mould from overflowing and the formation of defects on the moulded parts. According to the invention, the stiffness of the air spring 5 may be adjusted according to the viscosity of the moulded resins and the geometry of the parts for example. Other parameters may be taken in consideration to adjust the stiffness and other properties of the air spring 5.

As shown in FIG. 1, the closing and compression movement driven by the fixed part 2 of the press lasts for 0.15 to 0.25 seconds, and then the movement back to the initial position is initiated, this back movement corresponding to an opening movement of the press. This movement can also be seen in FIG. 2, where it can be observed that the speed becomes positive from 0.3 s onwards, which indicates a change of direction, i.e. an opening movement of the press. The pneumatic cylinder 12 is used to keep the mould closed and under pressure when the fixed part of the press is no longer active, i.e. after 0.3 s in our example. This allows, thanks to the rotation of the turret 45, on the one hand to continue cooling the moulded part and on the other hand to feed a new module in front of the fixed press for a new compression cycle.

The pneumatic cylinder 12 is also used to open the mould when the part has cooled down, allowing the moulded part to be removed from the cavity 15.

The pneumatic cylinder 12 can also be used to initiate the closing of the mould after dosing when the closing stroke is large. In this way, the fixed part of the press can be used mainly for the dose compression part, i.e. over a short compression stroke. As the mould closing part prior to the compression of the dose does not affect the quality of the parts produced, this part of the movement can be done by the pneumatic cylinder 12.

Figure 5:
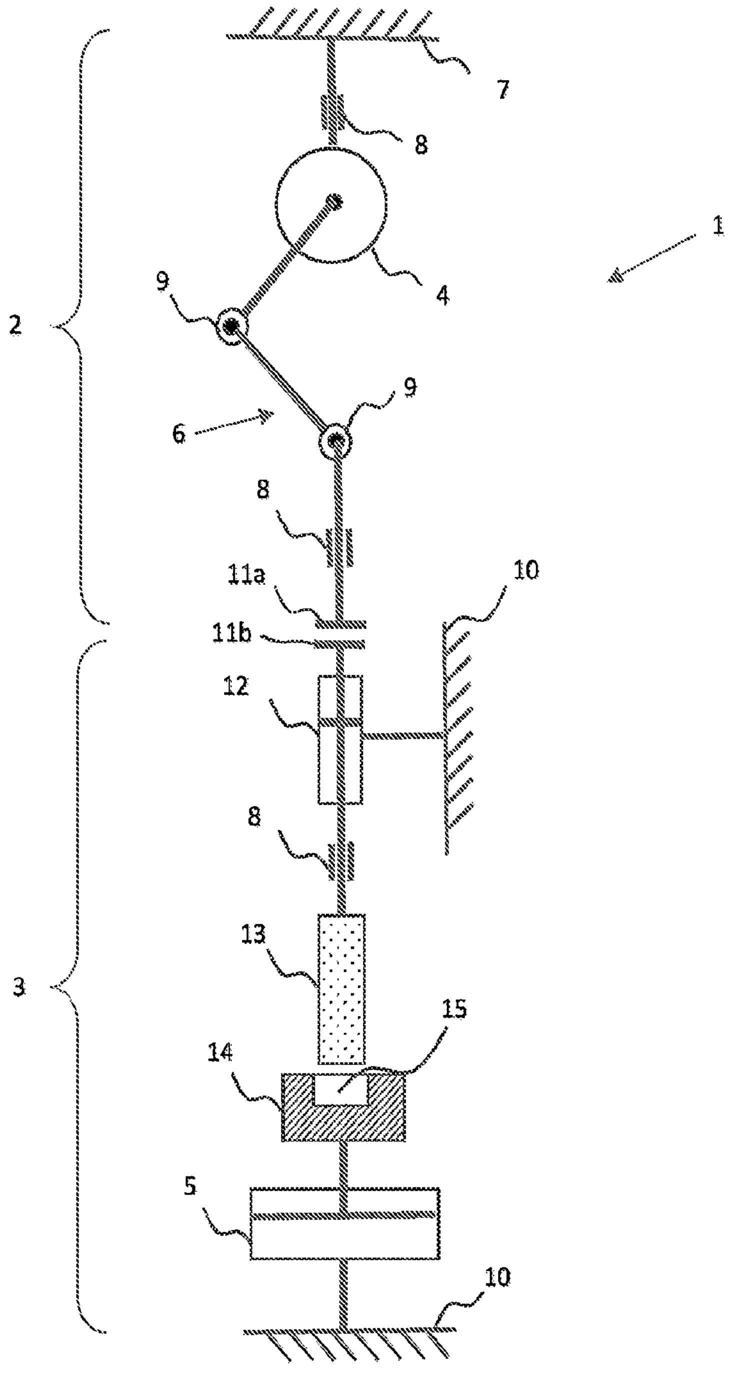

FIG. 5 illustrates another embodiment of the invention, in which the air spring 5 is associated with the moving part 3 instead of the fixed part 2 as in FIG. 4. This is advantageous when parts of different geometries are produced on moulds arranged on the same turret. In such case, the air spring 5 of each mould 13, 14 may be individually set for each mould.

Figure 6:
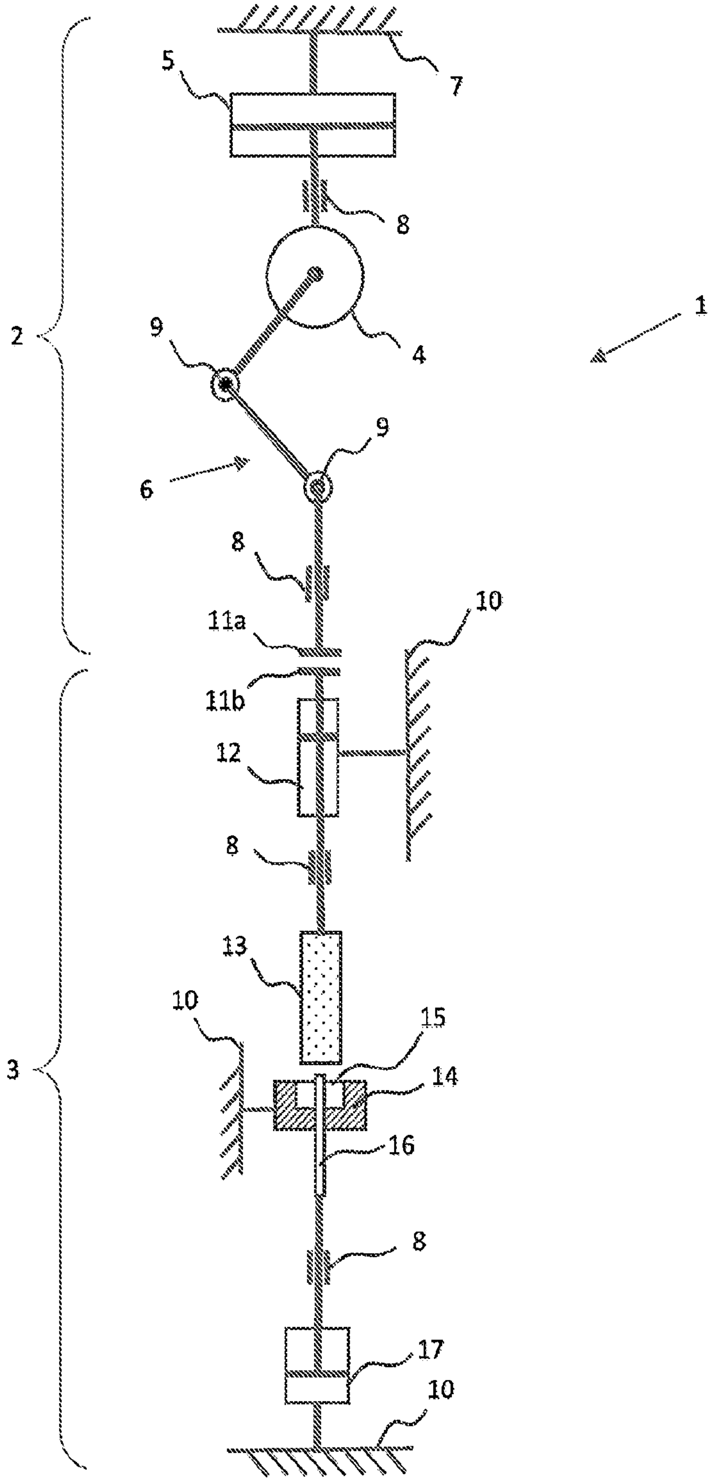

FIG. 6 illustrates a moulding device similar to the device illustrated in FIG. 4 and which is used to make objects with an orifice such as tube heads. In this device, the moving part 3 also comprises an orifice pin 16 defining the diameter of the orifice of the object. A dose having a ring geometry is deposited in the lower part 14 of the mould around the orifice pin 16. On closing the mould, contact between the upper part 13 and the orifice pin 16 drives the orifice pin and compresses the air spring 17. Alternatively, a mechanical spring may be used instead of air spring 17. The spring 17 prevents the passage of melt between the end of the orifice pin 16 and the upper mould 14 when the mould is closed.

Figure 7:
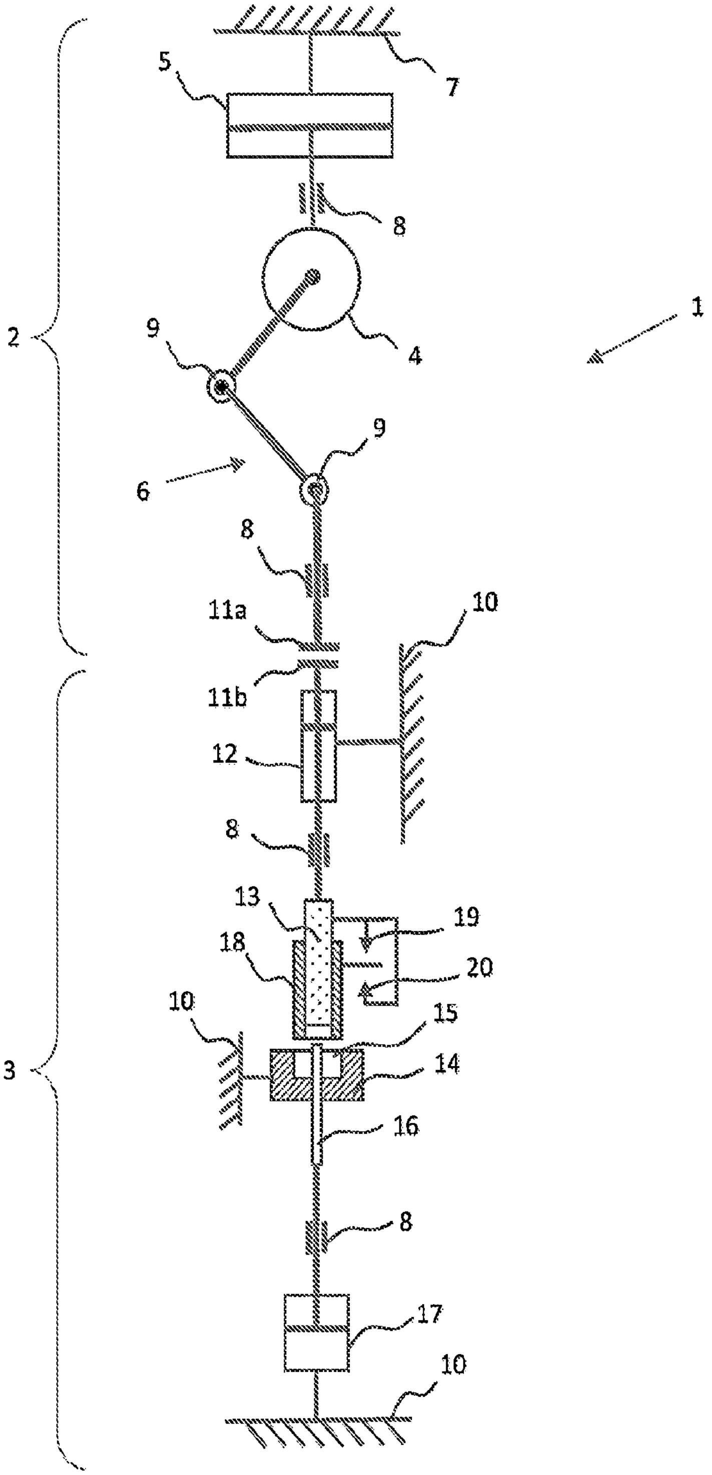

FIG. 7 illustrates a moulding device similar to that of FIG. 6 in which the upper part of the mould 13 also has a sliding sleeve 18 associated with upper and lower stops 19 and 20. The sliding sleeve 18 is particularly advantageous for improving the peripheral quality of the moulded parts. This sliding sleeve 18 improves the aesthetic quality of the tubes by avoiding a beading that forms at the weld. At the beginning of the moulding process, the sliding sleeve 18 traps the dose in the centre of the cavity. During moulding, the pressure of the molten resin in the cavity causes the sliding sleeve 18 to rise and mould the peripheral part of the object. The sliding sleeve 18 can be combined with an air spring to optimise its effect.

FIGS. 4 to 7 illustrate examples of moulding devices in which the fixed part 2 is shown at the top and the force of gravity is in the same direction as the pressing movement (i.e. vertical). Inverted systems not shown in which the press is located at the bottom are a variant of the invention within the frame of the present application. Other positions may of course also be used.

FIGS. 4 to 7 illustrate examples of devices in which the dose is deposited in the mould cavity 15. Similar devices not specifically illustrated in which the dose is deposited on the male part 13 of the moulds (e.g. mandrels) are another variant of the invention within the frame of the present application and may be used as well.

Figure 8:
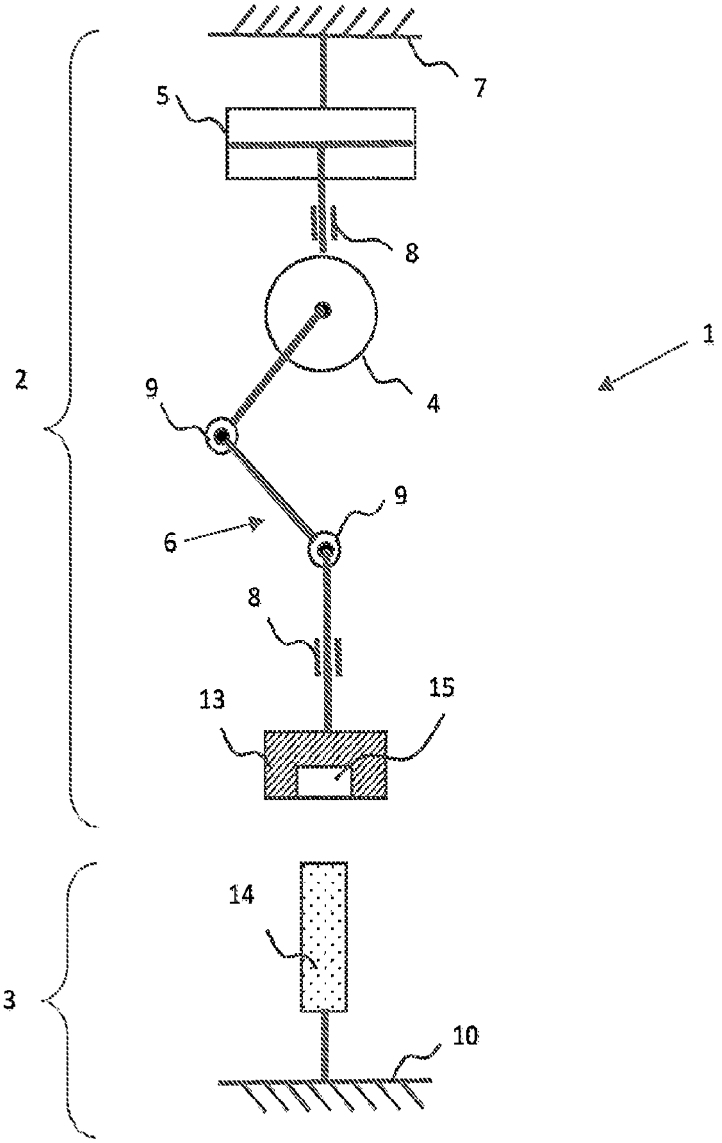
Figure 9:
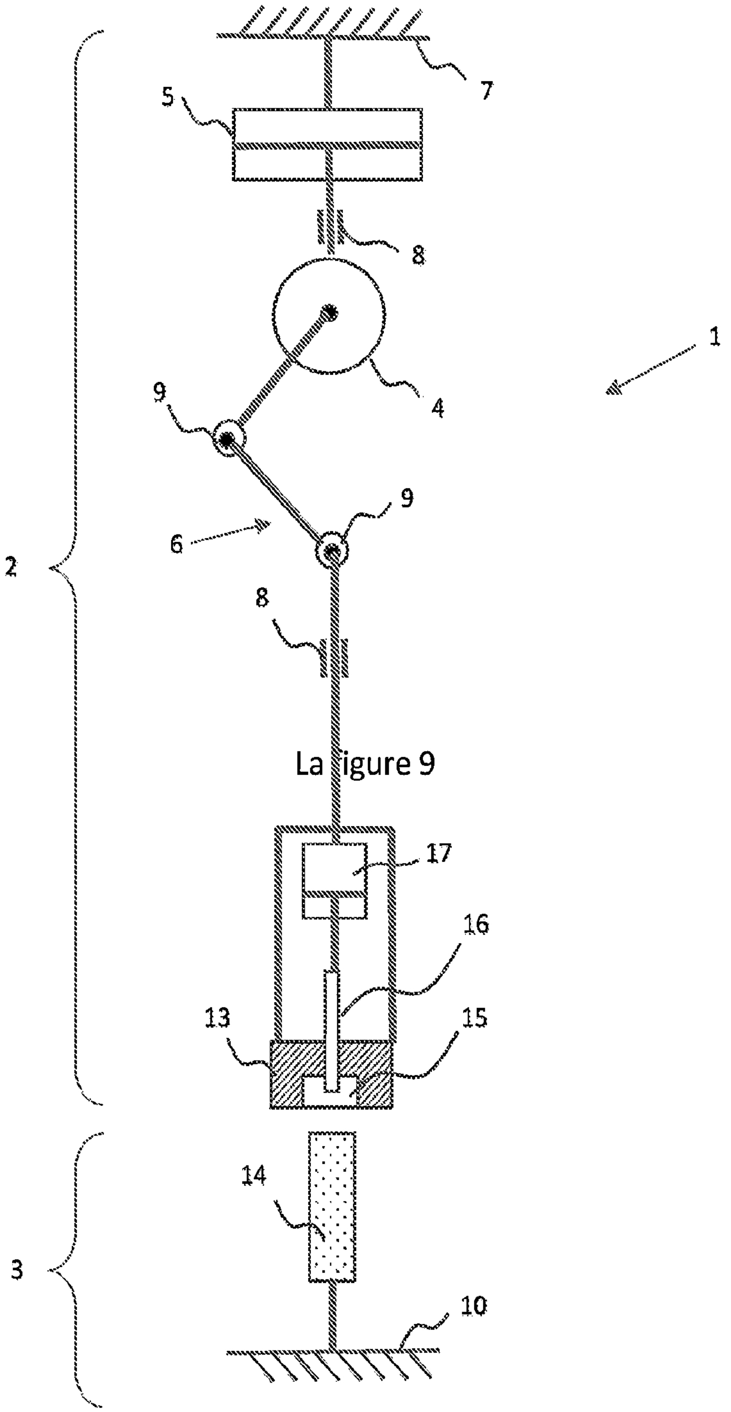

FIGS. 8 and 9 illustrate examples of devices in which the dose is deposited on mandrels; and in which the die (second part of the mould) is fixed to the press.

The compression device illustrated in FIG. 8 comprises a press 1, at least composed of a fixed part 2 and a mobile part 3; the mobile part 3 being coupled with the fixed part 2 during the closing movement of the mould. The fixed part of the press allows the closing movement of the mould to be controlled in a precise and repetitive manner, thanks to an electric motor 4, a toggle system 6, rotational guide means 9, linear guide means 8, and an air spring 5. Unlike in the prior art where the control is made by pressure, the present invention uses a position control which is therefore more predictable and more precise and allows to achieve the aims of the present invention.

As seen in FIG. 8, the upper part of the mold, in this example the die, is attached to the press mechanism. The upper part of the mold 13 is part of the fixed part of the press 2.

In the example illustrated in FIG. 8, the mold is opened at each press cycle, which implies that the part is not completely cooled after opening the mold.

After opening the mold, the molded part remains linked to the lower part of the mold 14. Post-cooling operations of the molded parts can be carried out on other stations of the turret (moving part 3).

FIG. 9 illustrates a device similar to that illustrated in FIG. 8 also comprising an orifice rod 16 for molding parts with orifices such as tube heads.

FIGS. 10 to 14 illustrate the dosing part of the moulding device and its control according to the invention.

FIGS. 10 to 13 more specifically illustrate the control of the dosing nozzle. This control makes it possible to adjust the mass and the geometry of the dose. For each material with a different rheological behaviour, this control can be adjusted. Accordingly, resins which are more fluid or more viscous can be dosed with greater precision and regularity. In particular, the invention allows the use of recycled, recyclable, biosourced or biodegradable materials and mix thereof, which would not be possible without this precise control.

Figure 10:
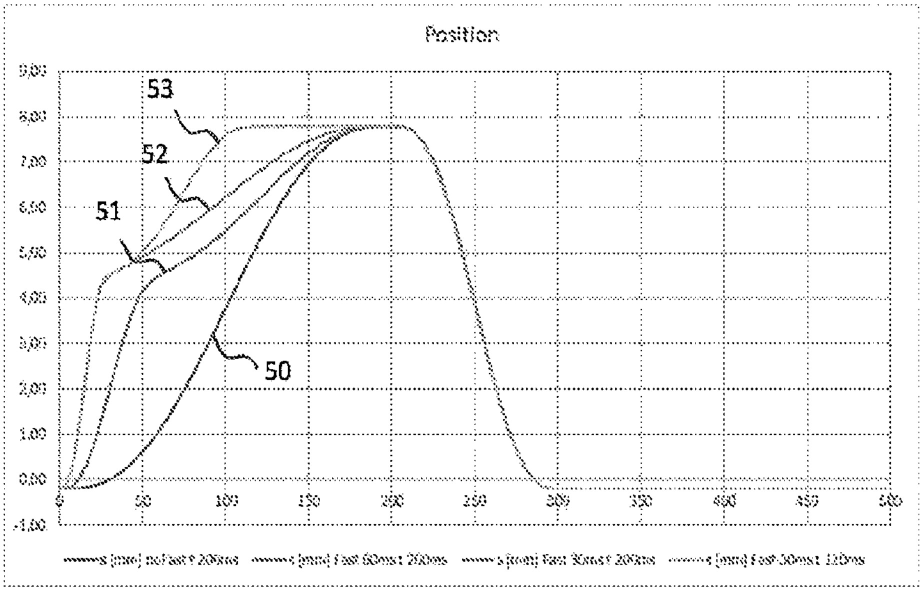
FIG. 10 shows the positional control of the metering valve movement as a function of time. More specifically.

FIG. 10 shows the positional control of the metering valve movement as a function of time. FIG. 10 shows the opening and closing movement of the valve in millimeters (y-axis) as a function of time in milliseconds (x-axis). The examples of control curves 50, 51, 52, or 53 show the new possibilities associated with the invention. For example, for a cycle time of 300 milliseconds, it can be seen that the opening time may be achieved more or less quickly; for example, in 200 milliseconds for the control curve 50 or in 120 milliseconds for the control curve 53. It can also be seen that it is possible to adopt a modulated opening speed on the control curves 51, 52 and 53, with a very fast initial opening and then a slower opening speed afterwards.

On curve 50, when time equals 0 ms, the valve is in the closed position. Between 0 and 200 ms, that is to say between 0% and 40% of the cycle time, the curve 50 shows an increase in the stroke corresponding to the opening phase of the valve. During this opening phase, a first part the dose is extruded. Between 200 ms and 300 ms, that is to say between 40% and 60% of the cycle time, the curve 50 shows a reduction in the stroke corresponding to the closing of the valve. During the valve closing phase, a second part of the dose is extruded, and the dose is cut off. Finally, between 300 ms and 500 ms, ie between 60% and 100% of the cycle time, the valve is in the closed position. During this phase, the reservoir 39 is filled for the next dosage.

On curve 51, when time equals 0 ms, the valve is in the closed position. Between 0 and 50 ms, that is to say between 0% and 10% of the cycle time, the curve 51 shows a first increase in the stroke corresponding to a rapid opening of the valve. Then, between 50 and 200 ms, ie between 10% and 40% of the cycle time, the curve 51 shows a second increase in the stroke corresponding to a slow opening of the valve. During this slow opening phase, a first part of the dose is extruded. Between 200 ms and 300 ms, that is to say between 40% and 60% of the cycle time, the curve 50 shows a reduction in the stroke corresponding to the closing of the valve. During the valve closing phase, a second part of the dose is extruded, and the dose is cut off. Finally, between 300 ms and 500 ms, ie between 60% and 100% of the cycle time, the valve is in the closed position. During this phase, the reservoir 39 is filled for the next dosage.

On curve 52, when time equals 0 ms, the valve is in the closed position. Between 0 and 25 ms, that is to say between 0% and 5% of the cycle time, the curve 51 shows a first increase in the stroke corresponding to a very rapid opening of the valve. Then, between 50 and 200 ms, ie between 5% and 40% of the cycle time, the curve 51 shows a second increase in the stroke corresponding to a slow opening of the valve. During this slow opening phase, a first part of the dose is extruded. Between 200 ms and 300 ms, that is to say between 40% and 60% of the cycle time, the curve 50 shows a reduction in the stroke corresponding to the closing of the valve. During the valve closing phase, a second part of the dose is extruded, and the dose is cut off. Finally, between 300 ms and 500 ms, ie between 60% and 100% of the cycle time, the valve is in the closed position. During this phase, the reservoir 39 is filled for the next dosage.

On curve 53, when time equals 0 ms, the valve is in the closed position. Between 0 and 25 ms, that is to say between 0% and 5% of the cycle time, the curve 51 shows a first increase in the stroke corresponding to a very rapid opening of the valve. Then, between 50 and 100 ms, ie between 5% and 20% of the cycle time, the curve 51 shows a second increase in the stroke corresponding to a rapid opening of the valve. During this rapid opening phase, a first part of the dose is extruded. Then, between 100 and 200 ms, that is to say between 20% and 40% of the cycle time, curve 51 shows a plateau in the stroke corresponding to the open position of the valve. During this open position of the valve, a second part of the dose is extruded. Between 200 ms and 300 ms, that is to say between 40% and 60% of the cycle time, the curve 50 shows a reduction in the stroke corresponding to the closing of the valve. During the valve closing phase, a third part of the dose is extruded, and the dose is cut off. Finally, between 300 ms and 500 ms, ie between 60% and 100% of the cycle time, the valve is in the closed position. During this phase, the reservoir 39 is filled for the next dosage.

According to the invention, the opening movement of the valve represents between 5% and 70% of the cycle time and preferably between 10% and 50% of the cycle time.

According to the invention, the opening movement of the valve has at least one phase and preferably at least 2 phases at different and controlled opening speeds.

According to the invention, the closing movement of the valve represents between 5% and 70% of the cycle time and preferably between 10% and 30% of the cycle time.

According to the invention, the time during which the valve remains in the closed position represents between 20% and 60% of the cycle time and preferably between 30% and 50% of the cycle time.

Figure 11:
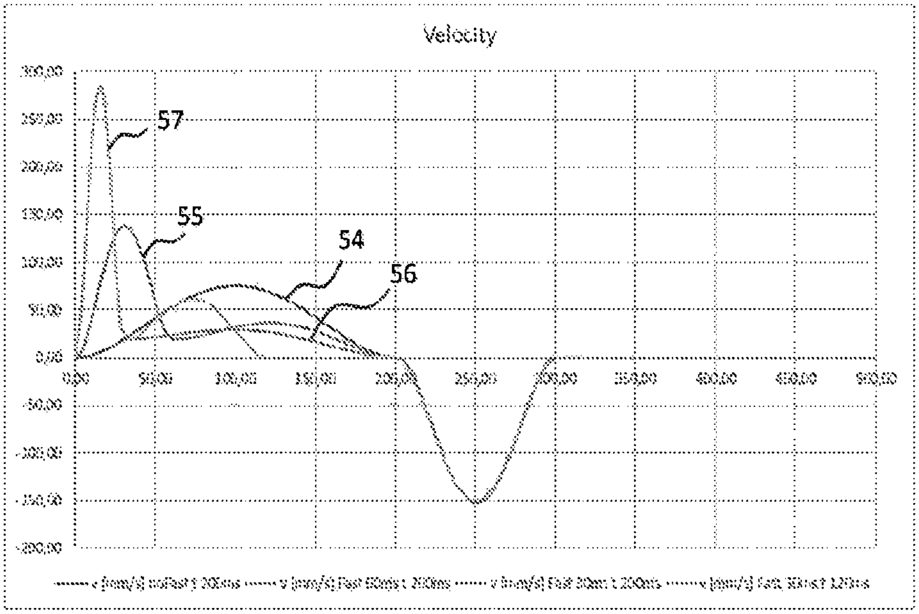
FIG. 11 shows the speed versus time of the valve opening and closing movement shown in FIG. 10. More specifically.

FIG. 11 shows the speed profile of the position control curves in FIG. 10. Thus, the speed profiles 54, 55, 56 and 57 correspond respectively to the position control curves 50, 51, 52 and 53 of FIG. 7. FIG. 11 shows the speed of the valve movement (y-axis) in millimeters per second as a function of time in milliseconds (x-axis).

The speed profile 54 corresponding to the control curve in position 50 shows that the opening speed passes through a maximum value of 75 millimeters per second after 100 milliseconds. On the contrary, the speed profiles 55, 56 and 57 show two maximum values of the speed, which illustrates the multiple possibilities of piloting. For example, the speed profile 57 corresponding to the control curve 53 shows a first maximum value of 280 millimeters per second after 30 milliseconds, and then a second maximum value of the speed of 55 millimeters per second after 75 milliseconds. After 200 milliseconds, the speed profile is negative, corresponding to the closing movement of the metering valve.

On curves 54, 55, 56 and 57, the initial speed is zero (valve closed) then passes through at least one maximum positive value corresponding to the opening of the valve and returns to zero (valve open), then the speed passes through a maximum negative value corresponding to the closing of the valve and returns to zero (valve closed).

On curve 54, we observe that initial speed of the valve is zero and the valve is closed. Then the speed increases and goes to a maximum opening speed (75 mm/s) at time 100 ms, i.e. at 20% of the cycle time. At 200 ms corresponding to 40% of the cycle time, the valve speed return to zero and the valve is open. From 200 ms, the speed becomes negative corresponding to a closing movement of the valve. The maximum closing speed (15 mm/s) is reached at time 250 ms, i.e. at 50% of the cycle time. At 300 ms corresponding to 60% of the cycle time, the valve returns to zero and the valve is closed again. From 300 ms to 500 ms, the speed of the valve remains zero.

On curve 55, we observe that initial speed of the valve is zero and the valve is closed. Then the speed increases and goes to a first maximum opening speed (138 mm/s) at time 32 ms, i.e. at 6.4% of the cycle time. Then the speed decreases and goes to a second maximum opening speed (36.7 mm/s) at time 120 ms, i.e. at 24% of the cycle time. At 200 ms corresponding to 40% of the cycle time, the valve speed return to zero and the valve is open. From 200 ms, the speed becomes negative corresponding to a closing movement of the valve. The maximum closing speed (150 mm/s) is reached at time 250 ms, i.e. at 50% of the cycle time. At 300 ms corresponding to 60% of the cycle time, the valve returns to zero and the valve is closed again. From 300 ms to 500 ms, the speed of the valve remains zero.

On curve 56, we observe that initial speed of the valve is zero and the valve is closed. Then the speed increases and goes to a first maximum opening speed (284 mm/s) at time 16 ms, i.e. at 3.2% of the cycle time. Then the speed decreases and goes to a second maximum opening speed (29.2 mm/s) at time 100 ms, i.e. at 20% of the cycle time. At 200 ms corresponding to 40% of the cycle time, the valve speed return to zero and the valve is open. From 200 ms, the speed becomes negative corresponding to a closing movement of the valve. The maximum closing speed (150 mm/s) is reached at time 250 ms, i.e. at 50% of the cycle time. At 300 ms corresponding to 60% of the cycle time, the valve returns to zero and the valve is closed again. From 300 ms to 500 ms, the speed of the valve remains zero.

On curve 57, we observe that initial speed of the valve is zero and the valve is closed. Then the speed increases and goes to a first maximum opening speed (284 mm/s) at time 16 ms, i.e. at 3.2% of the cycle time. Then the speed decreases and goes to a second maximum opening speed (61 mm/s) at time 72 ms, i.e. at 14.4% of the cycle time. At 120 ms corresponding to 24% of the cycle time, the valve speed return to zero and the valve is open. The speed of the valve remains zero from 120 ms to 200 ms, i.e. between 24% and 40% of the cycle time. From 200 ms, the speed becomes negative corresponding to a closing movement of the valve. The maximum closing speed (150 mm/s) is reached at time 250 ms, i.e. at 50% of the cycle time. At 300 ms corresponding to 60% of the cycle time, the valve returns to zero and the valve is closed again. From 300 ms to 500 ms, the speed of the valve remains zero.

According to the invention, the maximum opening speed of the valve is comprised between 10 mm/s and 500 mm/s, and preferably between 20 mm/s and 300 mm/s).

According to the invention, the maximum closing speed of the valve is comprised between 10 mm/s and 500 mm/s, and preferably between 100 mm/s and 300 mm/s).

According to the invention, the opening speed of the valve passes through one or more maximum values at a time between 2% and 50% of the cycle time and preferably between 3 and 40% of the cycle time.

According to the invention, the closing speed of the valve passes through one or more maximum values at a time between 30% and 80% of the cycle time, and preferably between 40 and 60% of the cycle time.

According to the invention, the opening speed of the valve passes through one or more maximum values at a time between 2% and 50% of the cycle time, and preferably between 3 and 40% of the cycle time.

According to the invention, the speed of the valve is zero for a total duration representing 20% to 70% of the cycle time and preferably for a total duration representing 30% to 60% of the cycle time.

Figure 12:
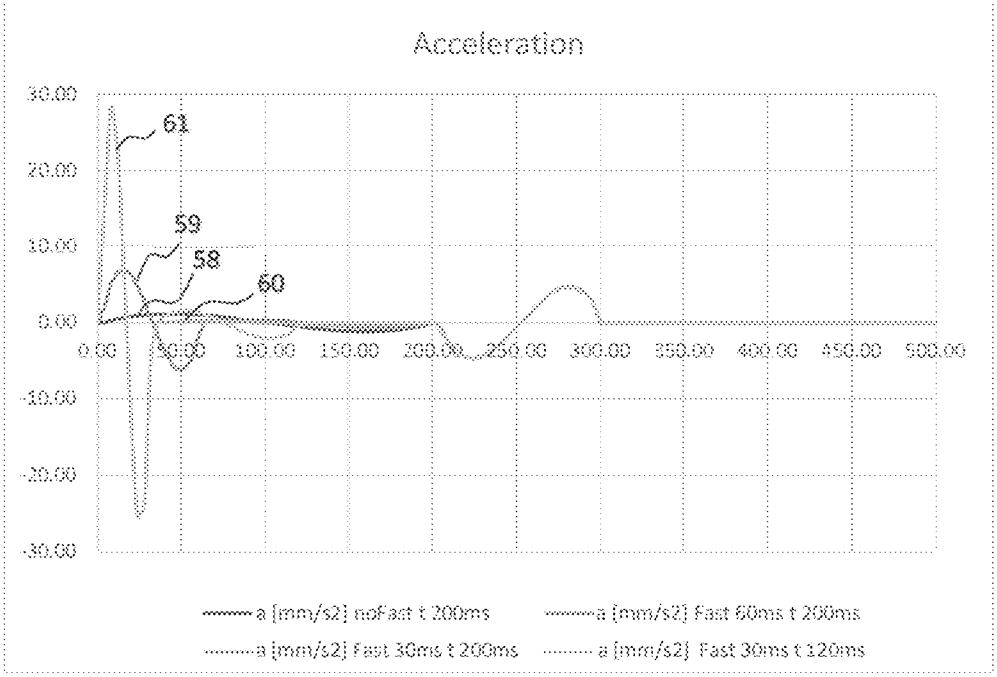
FIG. 12 shows the acceleration versus time of the valve opening and closing movement shown in FIG. 10. More specifically.

FIG. 12 is an illustration of the acceleration versus time profile of the valve movement shown in FIG. 10. In this figure the acceleration of the valve movement in millimeter per second squared (y-axis) is plotted against time in milliseconds (x-axis).

The acceleration curves 58, 59, 60 and 61 illustrated in FIG. 12 show between 0 ms and 200 ms a first phase of accelerations and decelerations linked to the opening of the valve; and a second phase of accelerations and decelerations between 200 m s and 500 ms linked to the closing of the valve.

On curve 58, the maximum acceleration of the opening movement (1.16 mm/s$^2$) is reached at time 44 ms, corresponding to 9% of the cycle time; and the maximum deceleration of the opening movement (−1.16 mm/s$^2$) is reached at time 156 ms, corresponding to 31% of the cycle time. We also observe on curve 58 that the maximum acceleration of the closing movement of the valve (−4.7 mm/s$^2$) is reached at time 222 ms, corresponding to 44% of the cycle time; and the maximum deceleration of the closing movement (4.7 mm/s$^2$) is reached at time 278 ms, corresponding to 56% of the cycle time. From 300 ms to 500 ms, the acceleration of the valve remains zero.

On curve 59, the maximum acceleration of the opening movement (6.8 mm/s$^2$) is reached at time 16 ms, corresponding to 3.2% of the cycle time; and the maximum deceleration of the opening movement (−6.8 mm/s$^2$) is reached at time 48 ms, corresponding to 9.6% of the cycle time. We also observe on curve 58, that the maximum acceleration of the closing movement of the valve (−4.7 mm/s$^2$) is reached at time 222 ms, corresponding to 44% of the cycle time; and the maximum deceleration of the closing movement (4.7 mm/s$^2$) is reached at time 278 ms, corresponding to 56% of the cycle time. From 300 ms to 500 ms, the acceleration of the valve remains zero.

On curve 60, the maximum acceleration of the opening movement (28 mm/s$^2$) is reached at time 8 ms, corresponding to 1.6% of the cycle time; and the maximum deceleration of the opening movement (−28 mm/s$^2$) is reached at time 26 ms, corresponding to 5.2% of the cycle time. We also observe on curve 58, that the maximum acceleration of the closing movement of the valve (−4.7 mm/s$^2$) is reached at time 222 ms, corresponding to 44% of the cycle time; and the maximum deceleration of the closing movement (4.7 mm/s$^2$) is reached at time 278 ms, corresponding to 56% of the cycle time. From 300 ms to 500 ms, the acceleration of the valve remains zero.

On curve 61, it can be clearly observed two phases of acceleration and deceleration of the opening movement of the valve. These two phases are less visible on curves 59 and 60. On curve 61, the maximum acceleration of the first phase (28 mm/s$^2$) is reached at time 8 ms, corresponding to 1.6% of the cycle time; and the maximum deceleration of the first phase (−28 mm/s$^2$) is reached at time 26 ms, corresponding to 5.2% of the cycle time. We also observe that the maximum acceleration of the second phase (2 mm/s$^2$) is reached at time 52 ms, corresponding to 10% of the cycle time; and the maximum deceleration of the second phase (−2 mm/s$^2$) is reached at time 102 ms, corresponding to 20% of the cycle time. We also observe on curve 61, that the maximum acceleration of the closing movement of the valve (−4.7 mm/s$^2$) is reached at time 222 ms, corresponding to 44% of the cycle time; and the maximum deceleration of the closing movement (4.7 mm/s$^2$) is reached at time 278 ms, corresponding to 56% of the cycle time. From 300 ms to 500 ms, the acceleration of the valve remains zero.

According to the invention, the maximum acceleration and deceleration of the opening movement of the dosing valve are comprised between 0.5 m/s$^2$ and 40 mm/s$^2$, and preferably between 1 mm/s$^2$ and 30 mm/s$^2$).

According to the invention, the maximum acceleration and deceleration of the closing movement of the dosing valve are comprised between 0.5 m/s$^2$ and 40 mm/s$^2$, and preferably between 1 mm/s$^2$ and 30 mm/s$^2$).

According to the invention, the maximum acceleration of the opening movement of the dosing valve is reached between 0.5% and 25% of the cycle time, and preferably between 1% and 15% of the cycle time.

According to the invention, the maximum deceleration of the opening movement of the press is reached between 3% and 45% of the cycle time, and preferably between 5% and 35% of the cycle time.

According to the invention, the maximum acceleration of the closing movement of the dosing valve is reached between 25% and 65% of the cycle time, and preferably between 35% and 55% of the cycle time.

According to the invention, the maximum deceleration of the closing movement of the dosing valve is reached between 35% and 75% of the cycle time, and preferably between 45% and 65% of the cycle time.

According to the invention, the opening of the dosing valve comprises at least one acceleration and deceleration phase and preferably comprises several acceleration and deceleration phases.

According to the invention, the closing of the dosing valve comprises at least one acceleration and deceleration phase and preferably comprises only one acceleration and deceleration phase.

Figure 13:
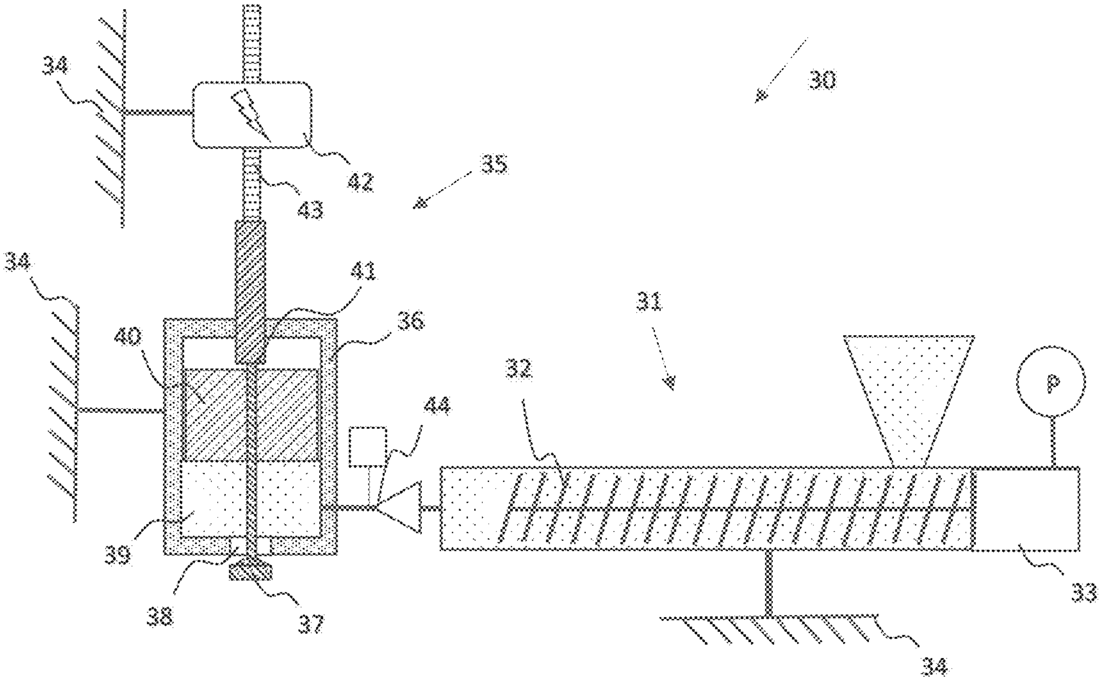
FIGS. 13 and 14 illustrate examples of servo-driven metering devices and systems according to the invention.
Figure 14:
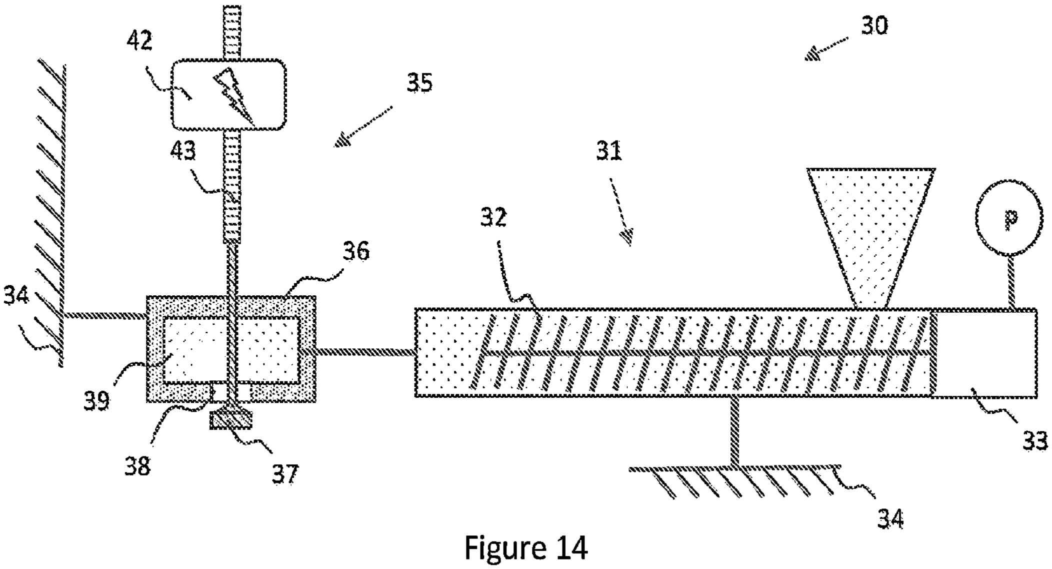

The control of the dosing nozzle shown in FIGS. 10 t0 12 can be achieved by the example devices shown in FIGS. 13 and 14.

FIG. 13 shows a dosing unit 30 comprising at least one extrusion unit 31 and a dosing nozzle 35.

The extrusion assembly 31 comprises mainly an extrusion screw 32 arranged inside a temperature-controlled barrel, a hopper through which the resin is fed into the screw. The extrusion assembly provides molten resin, which is mixed with the metering device 35. The extrusion assembly shown in FIG. 13 also includes an actuator 33 to transform the continuous flow rate supplied by the screw into a discontinuous feed rate to the dosing nozzle 35. Thus, the pneumatic cylinder 33 allows alternately to accumulate the resin upstream of the screw thanks to the backward movement of the screw (low pressure P in the cylinder 33), and then to transfer resin into the dosing nozzle 35 thanks to the forward movement of the screw (high pressure P in the cylinder 33). The pneumatic cylinder 33 is advantageously associated with a controlled valve 44 which is closed during the resin accumulation phase and which is open during the resin transfer phase.

The dosing nozzle 35 has a nozzle body 36, a valve 37 for opening or closing the orifice 38 through which the resin escapes from the reservoir 39 and forms the dose. In the example shown in FIG. 13, the dosing nozzle 35 also has a piston 40 which is set in motion via a step 41 on the valve axis. According to the invention, the valve 37 and the piston 40 are driven by an electric motor 42. In the example shown in FIG. 13, the electric motor 42 is connected to a rack 43 attached to the valve shaft. The extrusion unit 31 and the dosing nozzle 35 are fixed to a frame 34. During production, the dosing unit 30 is in a fixed position relative to the moving part 3 of the press shown in FIGS. 4 to 9.

FIG. 13 illustrates a volumetric dosing device, i.e. one that produces a dose with a controlled volume of material. The controlled movement of the valve which induces the movement of the piston 40 allows the volume of the reservoir 39 to be controlled and emptied at each dosing operation.

FIG. 14 illustrates an alternative dosing unit 30. In this example device, the mass of the dose is defined by controlling the movement of the valve 37 in conjunction with the pressure P in the cylinder 33. The precise control of the opening and closing movement of the valve as illustrated in FIGS. 10 to 12 in conjunction with the control of the pneumatic pressure P in the cylinder 33 makes it possible to obtain doses of controlled mass and geometry. In the example of the dosing device shown in FIG. 14, the extrusion unit 31 is directly connected to the tank 39. In another example, a pilot valve (see reference 44 in FIG. 13) is positioned between the extrusion unit 31 and the dosing nozzle 35.

Figure 16:
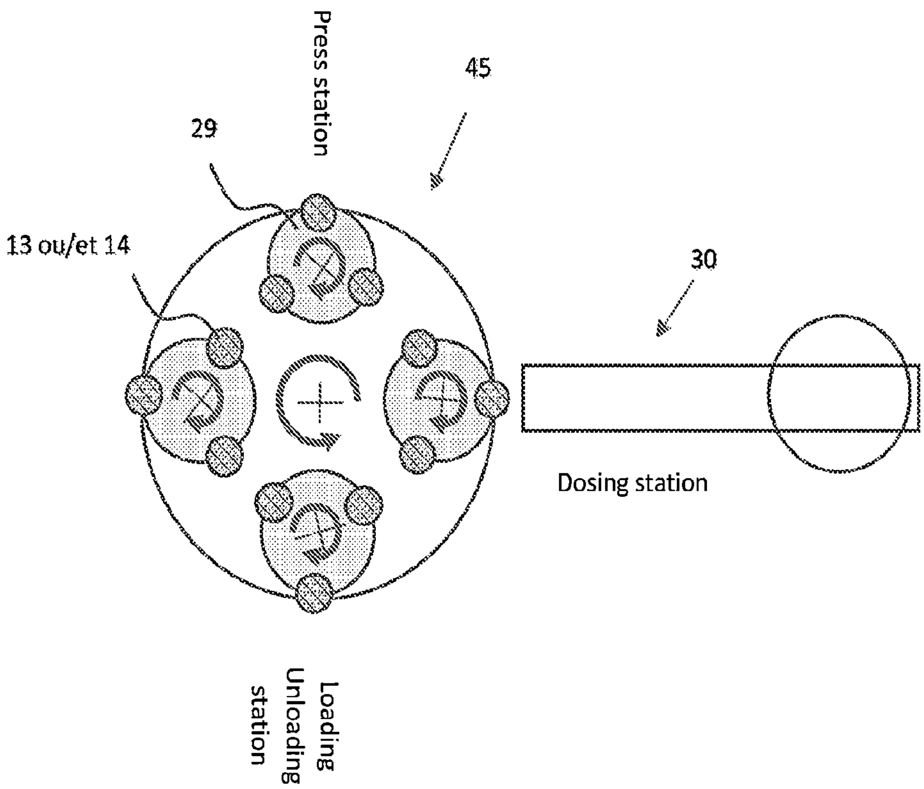

FIGS. 15 and 16 illustrate schematic top view of examples of compression moulding machines.

FIG. 15 shows a schematic top view of an example of a compression moulding machine. This machine comprises a dosing unit 30, a rotating turret 45 transporting the moulds 13, 14, a press 1 and a discharge device (unloading station). Due to the indexed rotary movement of the turret 45, the moulds 13, 14 stop successively in front of the dosing, compression, cooling and discharge stations indicated in FIG. 15. According to a preferred embodiment of the invention, the turret 45 is driven by a discontinuous rotational movement. In another embodiment, the turret 45 is driven by a continuous rotational movement (constant rotational speed).

Due to the indexed rotary movement of the turret 45, the moulds 13, 14 stop successively in front of the dosing, compression, cooling and discharge stations indicated in FIG. 15. According to a preferred embodiment of the invention, the turret 45 is driven by a discontinuous rotational movement. In another embodiment, the turret 45 is driven by a continuous rotational movement (constant rotational speed).

FIG. 16 shows another schematic top view of an example of a compression moulding machine. This machine, which is described in application patent WO2017137079, comprises a dosing unit 30, a rotating turret 45 transporting satellite turrets 29 on which moulds 13, 14 are fixed, a press and a loading and unloading device/stations. This machine is characterized by the fact that the satellite turrets turn in the opposite direction to that of the main turret. According to a preferred embodiment, the turret 45 of the machine shown in FIG. 16 is driven by a continuous rotational movement. In another embodiment, the turret 45 is driven by a discontinuous rotational movement.

The invention makes it possible to produce single-layer or multilayer objects by compression moulding of a monolayer or multilayer dose, such as tube heads, closures or other types of packaging such as capsules.

The present description is neither intended nor should it be construed as being representative of the full extent and scope of the present invention. The present invention is set forth in various levels of detail herein as well as in the attached drawings and in the detailed description of the invention and no limitation as to the scope of the present invention is intended by either the inclusion or non-inclusion of elements, components, etc. Additional aspects of the present invention have become more readily apparent from the detailed description, particularly when taken together with the drawings. All values (time, sizes, percentages etc.) are given in the present description as non-limiting examples/values and other such values are possible depending on circumstances, size and configuration of the machine and parts thereof and/or of the product to be moulded (its size, dimensions etc.), the quantity of material being moulded etc.

Moreover, exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with an exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to embodiments of the present invention, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A moulding method for moulding products from a dose of molten material, with a moulding device (1) comprising at least a dosing unit (30);

at least one mould formed of at least a first part and a second part (13,14);

an electrical motor (4) that pilots a compression movement of at least one of said parts of the mould towards the other of said parts;

a rotating turret (45);

a spring (5) that defines a moulding force;

wherein at least the electrical motor (4) and the dosing unit (30) are in a fixed position in the moulding device (1);

wherein at least one of said parts (13,14) of the mould rotates with the turret (45);

the moulding method being characterized in that the movement of one of said parts (13,14) of the mould towards the other of said parts (13,14) is controlled in position and the compression movement represents between 5% and 40% of the cycle time.

2. The method according to claim 1, wherein it comprises an approach movement of said parts of the mould towards each other wherein the approach movement represents between 10% and 50% of the cycle time.

3. The method according to claim 1, wherein it comprises a step of holding said parts of the mould under pressure which represents between 5% and 50% of the cycle time.

4. The method according to claim 1, wherein a maximum closing speed is reached between 5% and 25% of the cycle time, a constant speed is reached between 65% and 95% of the cycle time.

5. The method according to claim 1, wherein a maximum closing acceleration is reached between 2% and 20% of the cycle time and a maximum closing deceleration is reached between 10% and 40% of the cycle time.

6. A moulding method for moulding products from a dose of molten material, with a moulding device comprising at least a dosing unit (30) with a valve (37) having at least an opening movement and a closing movement driven by a motor (42);

the moulding method being characterized in that at least the opening movement of the valve (37) is controlled in accordance with the material of the dose and the opening movement of the valve represents between 5% and 70% of the cycle time.

7. The method according to claim 6, wherein the valve (37) remains in a closed position between 20% and 60% of the cycle time.

8. The method according to claim 6, wherein the closing movement of the valve (37) represents between 5% and 70% of the cycle time.

9. The method according to claim 6, wherein the opening movement speed of the valve (37) passes through one or more maximum values at a time between 2% and 50% of the cycle time and wherein the closing movement speed of the valve (37) passes through one or more maximum values at a time between 30% and 80% of the cycle time.

10. The method according to claim 6, wherein the opening of the valve (37) comprises at least one acceleration and deceleration phase and the closing of the valve (37) comprises at least one acceleration and deceleration phase.

11. The method according to claim 10, wherein the maximum acceleration of the opening movement of the valve (37) is reached between 0.5% and 25% of the cycle time and the maximum deceleration of the opening movement of the valve (37) is reached between 3% and 45% of the cycle time.

12. The method according to claim 10, wherein the maximum acceleration of the closing movement of the valve (37) is reached between 25% and 65% of the cycle time and the maximum deceleration of the closing movement of the valve (37) is reached between 35% and 75% of the cycle time.

13. A moulding device (1) comprising at least a dosing unit (30) with a valve (37) having at least an opening movement and a closing movement driven by a motor (42);

at least one mould formed of at least a first part and a second part (13,14);

an electrical motor (4) that pilots a compression movement of at least one of said parts of the mould towards the other of said parts;

a rotating turret (45);

a spring (5) that defines a moulding force;

wherein at least the electrical (4) and the dosing unit (30) are in a fixed position in the moulding device (1)

and wherein at least one of said parts (13,14) of the mould rotates with the turret (45), wherein the electrical motor (4) controls the compression movement in position, the compression movement representing between 5% and 40% of the cycle time.

14. The device as defined in claim 13, wherein said spring (5) is placed between the motor (4) and the moulding device (1).

15. The device as defined in claim 13, wherein said spring (5) is placed between the rotating turret (45) and one of said parts (13, 14) of the mould.

* * * * *